United States Patent
Zhang et al.

(10) Patent No.: US 12,522,124 B1
(45) Date of Patent: Jan. 13, 2026

(54) CANTILEVERED VEHICLE BOX SLIDE-OUT SYSTEM

(71) Applicants: Xinfang Zhang, Springfield, MO (US); Xiaopu Zhang, Springfield, MO (US)

(72) Inventors: Xinfang Zhang, Springfield, MO (US); Xiaopu Zhang, Springfield, MO (US)

(*) Notice: Subject to any disclaimer, the term of this patent is extended or adjusted under 35 U.S.C. 154(b) by 38 days.

(21) Appl. No.: 18/772,107

(22) Filed: Jul. 13, 2024

(51) Int. Cl.
  *B60P 3/34* (2006.01)
  *F16H 19/04* (2006.01)

(52) U.S. Cl.
  CPC ............... *B60P 3/34* (2013.01); *F16H 19/04* (2013.01)

(58) Field of Classification Search
  CPC .. B60P 3/34; B60P 3/39; E04B 1/4305; E04B 1/3431; F16H 19/04
  USPC .......... 296/165, 170–173, 175, 26.01, 26.05, 296/26.09, 26.13
  See application file for complete search history.

(56) References Cited

U.S. PATENT DOCUMENTS

| | | | | |
|---|---|---|---|---|
| 2002/0093213 A1* | 7/2002 | Kreil | ......................... | B60P 3/34 296/26.01 |
| 2003/0155791 A1* | 8/2003 | Gurdjian | ................... | B60P 3/34 296/156 |
| 2006/0076798 A1* | 4/2006 | Kunz | ........................ | B60P 3/34 296/175 |
| 2007/0194587 A1* | 8/2007 | Wolf | ........................ | B60P 3/34 296/26.13 |
| 2008/0265618 A1* | 10/2008 | Cadena | ..................... | B60P 3/34 296/175 |
| 2013/0106131 A1* | 5/2013 | Yoder | ....................... | B60P 3/34 296/26.13 |
| 2013/0305627 A1* | 11/2013 | Pike | ......................... | F16B 7/10 52/79.5 |

* cited by examiner

*Primary Examiner* — Gregory A Blankenship (57) ABSTRACT

The present application relates to a cantilevered vehicle box slide-out system, including a cantilevered moving component, a drive device, a connecting plate, a support frame, and bearing boxes, all integrally set inside the bearing boxes located at the lower part of the slide-out box. There is no need to dismantle the vehicle chassis; simply fixing the support frame to the vehicle body allows the slide-out box to be set at the vehicle body's opening. This application can realize the slide-out of the vehicle box, increasing usable space, facilitating convenient installation and removal, and ensuring a neat and aesthetically pleasing appearance.

11 Claims, 10 Drawing Sheets

CANTILEVERED VEHICLE BOX SLIDE-OUT SYSTEM

TECHNICAL FIELD

The present invention relates to the technical field of increasing the internal space of vehicles, particularly to a cantilevered vehicle box slide-out system.

BACKGROUND OF THE INVENTION

Current vehicles and RVs utilize slide-out boxes to increase the interior space. The outer wall of the slide-out box is flush with the vehicle's exterior during travel. When the vehicle stops, the slide-out box extends from the vehicle's opening, increasing the interior space.

The pattern—US201615339481A discloses a device with a slide-out mechanism located below the vehicle body, which is not integrated, resulting in occupying a lot of space, complex installation, and unstable operation.

The pattern—U.S. Pat. No. 7,293,814B2 discloses a vehicle slide-out frame with a slide-out mechanism also located below the slide-out box. When the entire slide-out box is extended, the slide-out mechanism is directly exposed, leading to complex installation and negatively affecting aesthetics.

The pattern—U.S. Ser. No. 11/964,606B2 discloses a slide-out system installed between the vehicle's opening frame and the slide-out box, causing a wide gap between the frame and the slide-out box, which reduces overall vehicle aesthetics and equipment lifespan

SUMMARY OF THE INVENTION

To address the issues of current vehicle slide-out mechanisms being installed at the bottom or sides of the vehicle resulting in occupying a lot of space in the vehicle box, complex installation, and inconvenience for maintenance, a cantilevered telescopic moving component is proposed. This component integrates into the corresponding bearing boxes on both sides at the lower part of the vehicle slide-out box, forming a cantilevered vehicle box slide-out system that is neat, space-saving, easy to install and remove, and increases vehicle usable space.

This application provides a cantilevered moving component used in a vehicle slide-out system, adopting the following technical scheme: a vehicle slide-out system, comprising a slide-out box, a cantilevered moving component, a drive device, a support frame, and a bearing box. The slide-out box is set at the opening of the vehicle body. The bearing box is fixed on lower part of the slide-out box. One side of the cantilevered moving component is fixed on the bearing box, while the other side is fixed on the support frame. The upper part of the drive device is fixed on the bearing box, and the lower part is fixed on the support frame. The support frame is fixed on the vehicle body. The bottom of the bearing box is provided with a long opening, through which the bearing box slides back and forth at the lower end of the support frame.

DETAILED DESCRIPTION OF THE PREFERRED EMBODIMENTS

By adopting the above technical scheme, the cantilevered moving component, the drive device, and part of the support frame are integrated into the bearing box. This configuration isolates the cantilevered moving component and the drive device from external influences, facilitating installation and removal, providing an aesthetically pleasing appearance, and increasing the internal usable space of the vehicle.

Preferably, the cantilevered moving component includes a first sliding combination, a second sliding combination, and a Z-shaped connecting plate. The first sliding combination includes a first guide rail and a first slider, where one side of the first guide rail is fixed on the Z-shaped connecting plate, and the other side is slidably connected with the first slider. The first slider is fixed on the support frame. The second sliding combination includes a second guide rail and a second slider, where one side of the second guide rail is fixed on the bearing box, and the other side is slidably connected with the second slider. The second slider is fixed on the Z-shaped connecting plate.

By adopting the above technical scheme, one side of the second guide rail is fixed on the bearing box, allowing the bearing box to drive the second guide rail to slide. The first guide rail is slidably connected with the first slider, and the second guide rail is slidably connected with the second slider, reducing sliding resistance and facilitating the telescopic sliding of the cantilevered moving component.

Preferably, both ends of the first guide rail are provided with a first limit plate and a second limit plate, and both ends of the second guide rail are provided with a third limit plate and a fourth limit plate.

By adopting the above technical scheme, the first limit plate and the second limit plate can control the sliding length of the Z-shaped connecting plate, while the third limit plate and the fourth limit plate control the sliding length of the second guide rail and can pull the Z-shaped connecting plate to slide.

Preferably, the Z-shaped connecting plate includes an upper plate, a lower plate, and a transverse plate. The transverse plate separates the first guide rail from the second slider. Both ends of the lower plate are provided with a third baffle and a fourth baffle. The second slider is fixed between the third baffle and the fourth baffle. The third limit plate corresponds to the third baffle, and the fourth limit plate corresponds to the fourth baffle.

By adopting the above technical scheme, when the cantilevered moving component slides out and the third limit plate hits the third baffle, it pulls the Z-shaped connecting plate to slide outward. When the cantilevered moving component retracts and the fourth limit plate hits the fourth baffle, it pulls the Z-shaped connecting plate to retract inward.

Preferably, the drive device includes a motor base, a motor, a reducer, a gear, a rack, and a rack frame. The motor is installed on the motor base, and the motor's output shaft is connected to the reducer. The reducer's output shaft is connected to the gear. The motor drives the gear to rotate through the reducer. The motor base, motor, and reducer are fixed on the support frame. The rack is installed on the rack frame, which is fixed on the bearing box. The teeth of the gear engage with the teeth of the rack, converting the rotational movement of the gear into the linear movement of the rack.

By adopting the above technical scheme, the drive device converts the rotational movement of the gear into the linear movement of the rack, driving the slide-out box to slide out and retract.

Preferably, the support frame includes a top plate, a vertical plate, a bottom plate, and a first baffle and a second baffle set on both sides of the support frame. The first baffle corresponds to the first limit plate, and the second baffle corresponds to the second limit plate.

By adopting the above technical scheme, the support frame can bear the drive device and the cantilevered moving component, and at the same time transfer the weight of the entire slide-out box to the vehicle body. When the cantilevered moving component slides out and the first limit plate hits the first baffle, the cantilevered moving component is fully extended. When the cantilevered moving component retracts and the second limit plate hits the second baffle, the cantilevered moving component is fully retracted.

Preferably, the bottom of the bearing box is provided with a long opening, through which the bearing box slides back and forth at the lower end of the support frame.

By adopting the above technical scheme, the slide-out box can conveniently slide out.

In summary, this application includes at least the following beneficial technical effects:

1. Integrating the cantilevered moving component, the drive device, and part of the support frame within the bearing box can isolate external influences on the cantilevered moving component and the drive device, facilitating installation and removal. It also improves aesthetics and can increase the internal usable space of the vehicle.
2. The cantilevered moving component can achieve a two-stage telescopic extension, increasing the slide-out space.
3. Since the entire cantilevered slide-out device within the bearing box is integrally connected to the support frame, there is no need to dismantle the vehicle's lower chassis. Installation and removal are convenient, requiring only the fixation of the support frame's bottom plate to the vehicle body to set the entire slide-out box at the vehicle's opening.

BRIEF DESCRIPTION OF DRAWINGS

To more clearly explain the technical solutions of the present invention, the necessary drawings for the description are briefly introduced below. It is evident that the drawings described below are only some embodiments of the present invention. For those skilled in this field, other drawings can be obtained based on these drawings without creative labor.

BRIEF DESCRIPTION OF THE FIGS.

Follow are the reference numbers appear in the drawings:
1. Vehicle body
2. Slide-out box
3. Bearing box, 30. Cantilevered moving component, 31. First sliding combination, 32. Second sliding combination, 34. Drive device, 301A. First limit plate, 301B. Second limit plate, 302. Rack, 303. Motor, 304. Gear, 305. Reducer, 306A. First baffle, 306B. Second baffle, 307. First guide rail, 308A. Third baffle, 308B. Fourth baffle, 309. Second guide rail, 310A. Third limit plate, 310B. Fourth limit plate, 311. Rack frame, 312. First slider, 313. Second slider
4. Z-shaped connecting plate, 401. Upper plate, 402. Lower plate, 403. Transverse plate
5. Support frame, 501. Top plate, 502. Bottom plate, 503. Vertical plate
6. Motor base
7. Long strip opening
8. Fixing frame fixing hole
9. Second guide rail fixing hole
10. First slider fixing hole
11. First guide rail fixing hole
12. Second slider fixing hole

DETAILED DESCRIPTION OF THE INVENTION

To make the objectives, features, and advantages of the present invention more apparent and understandable, the following describes the technical solutions of the present invention clearly and comprehensively in conjunction with the accompanying drawings in specific embodiments. It is evident that the described embodiments are only part of the embodiments of the present invention and not all of them. Based on the embodiments of this patent, all other embodiments obtained by those skilled in the field without creative work fall within the scope of protection of this patent.

Figure 1:
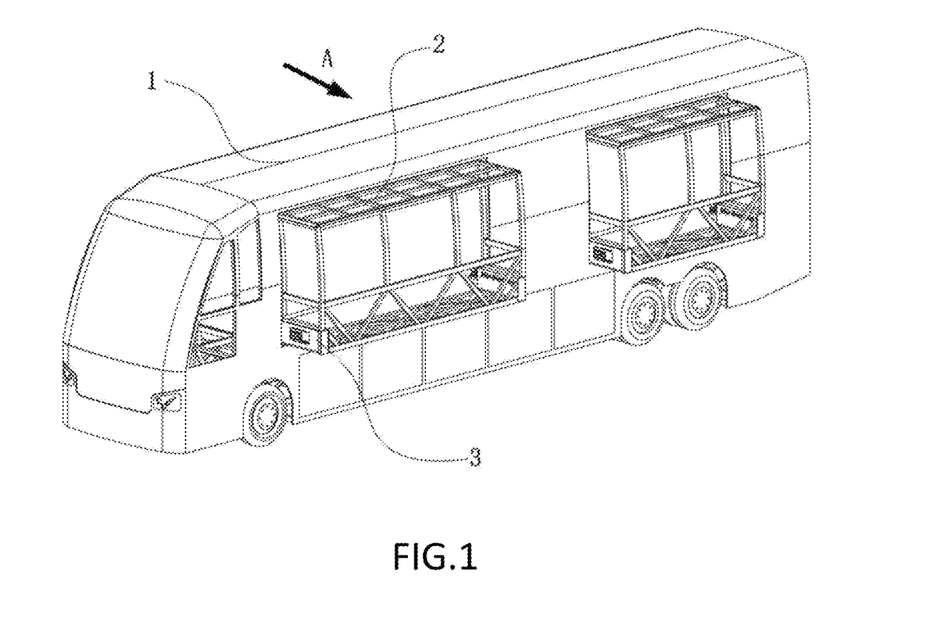
FIG. 1 is a schematic diagram of the slide-out box sliding out from the vehicle body opening in a specific embodiment of the present invention.
Figure 2:
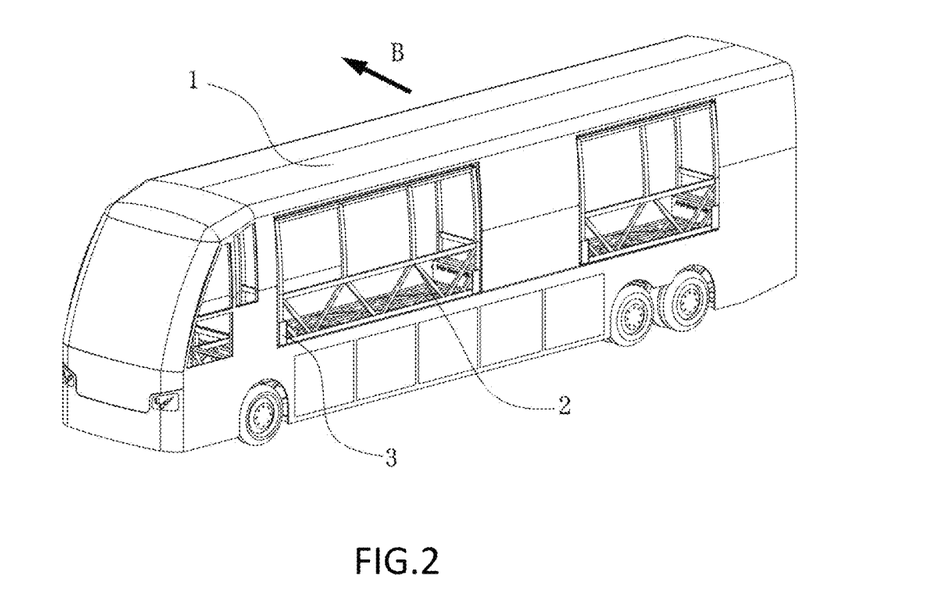
FIG. 2 is a schematic diagram of the slide-out box fully retracted in a specific embodiment of the present invention.

Referring to FIGS. 1 and 2, the structure diagrams of the slide-out box fully extended and fully retracted show the slide-out box 2 set at the opening of the vehicle body 1. The slide-out box 2 is made of aluminum alloy or other lightweight materials. The bearing boxes 3 are fixed on the lower part of the slide-out box 2. When retracted, the slide-out box 2 is flush with the vehicle body 1, increasing the internal space of the vehicle without affecting the overall aesthetic.

Figure 3:
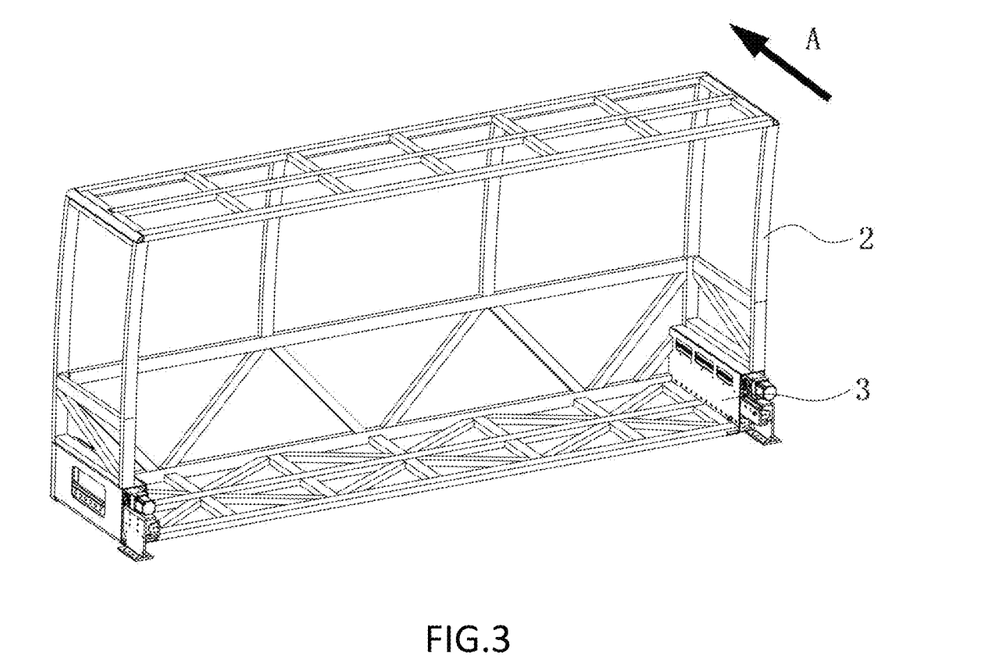
FIG. 3 is a axonometric diagram of the slide-out box in a specific embodiment of the present invention.
Figure 4:
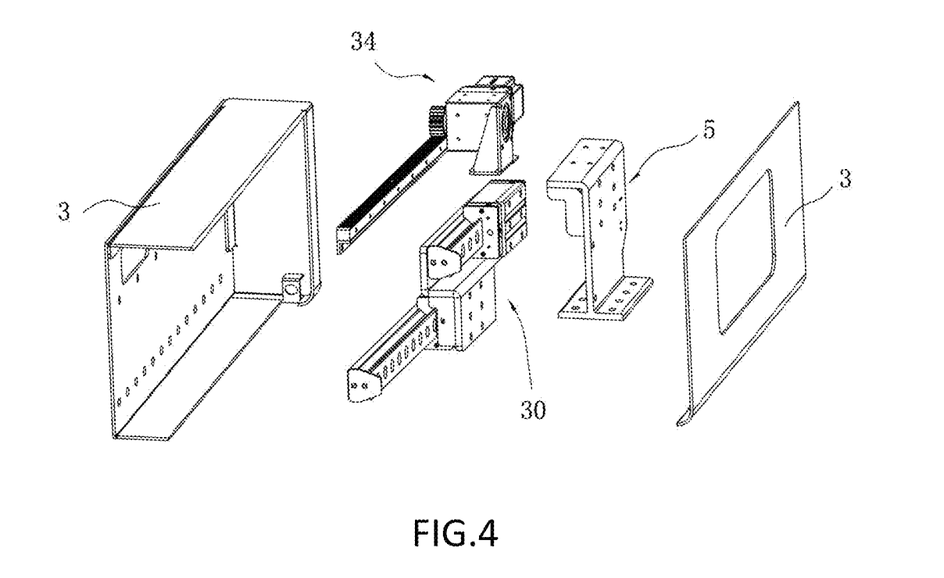
FIG. 4 is a schematic diagram of the bearing box component device in a specific embodiment of the present invention.
Figure 5:
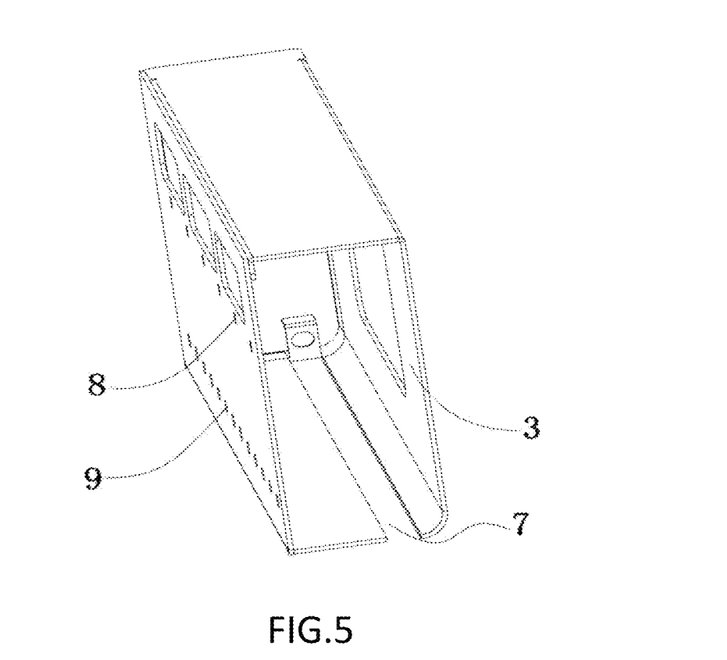
FIG. 5 is a schematic diagram of the bearing box structure in a specific embodiment of the present invention.

Referring to FIGS. 3 to 5, a cantilevered vehicle box slide-out system includes a slide-out box 2, a cantilevered moving component 30, a drive device 34, a support frame 5, and bearing boxes 3. The two bearing boxes 3 have identical internal structures, are set correspondingly, move synchronously, and bear the weight of the slide-out box 2. When the vehicle stops, the slide-out box 2 can slide out from the opening of the vehicle body 1 through the long strip opening 7 set on the bearing boxes 3.

Figure 6:
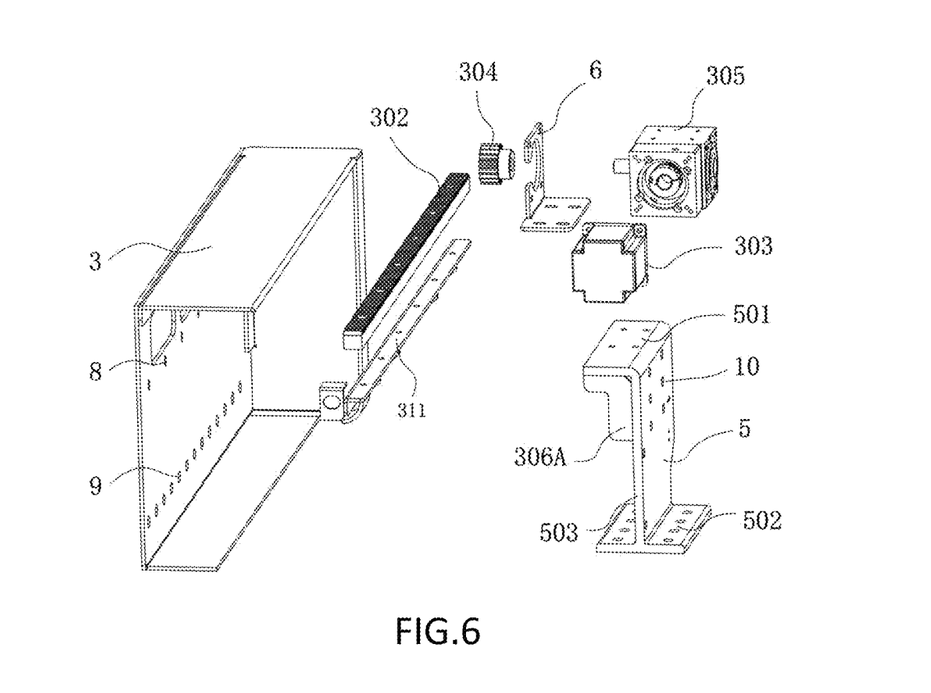
FIG. 6 is a exploded schematic diagram of the drive device in a specific embodiment of the present invention.
Figure 7:
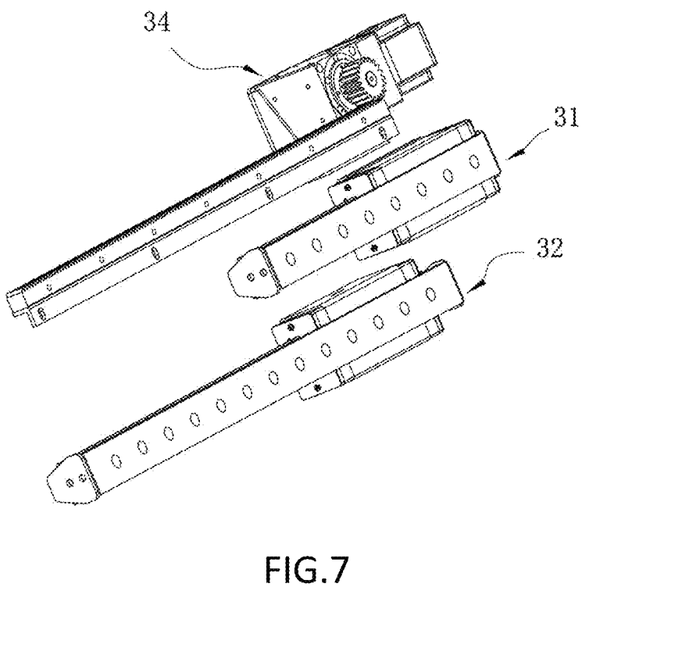
FIG. 7 is a schematic diagram of the drive device cantilever component in a specific embodiment of the present invention.
Figure 8:
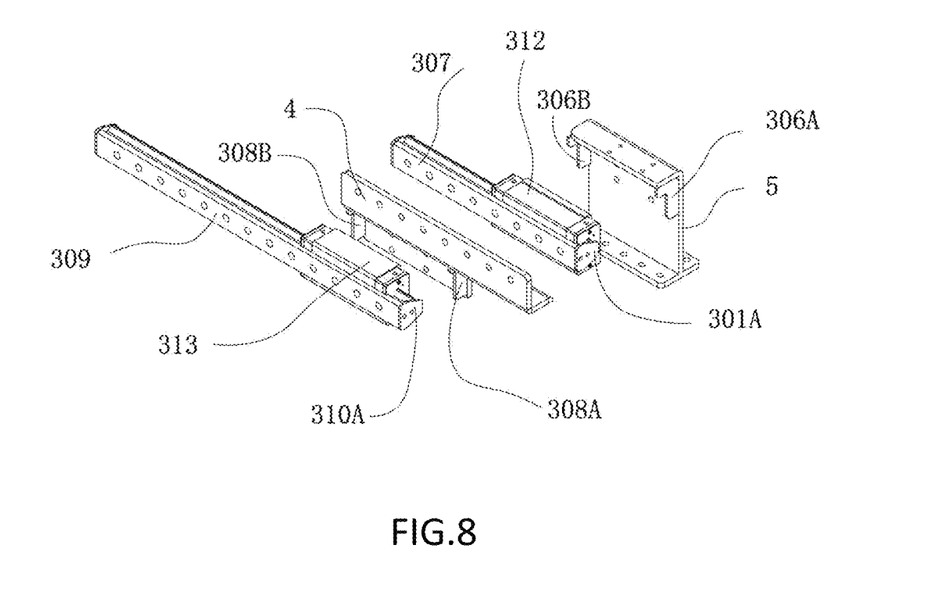
FIG. 8 is a schematic diagram of the cantilever moving component in a specific embodiment of the present invention.
Figure 9:
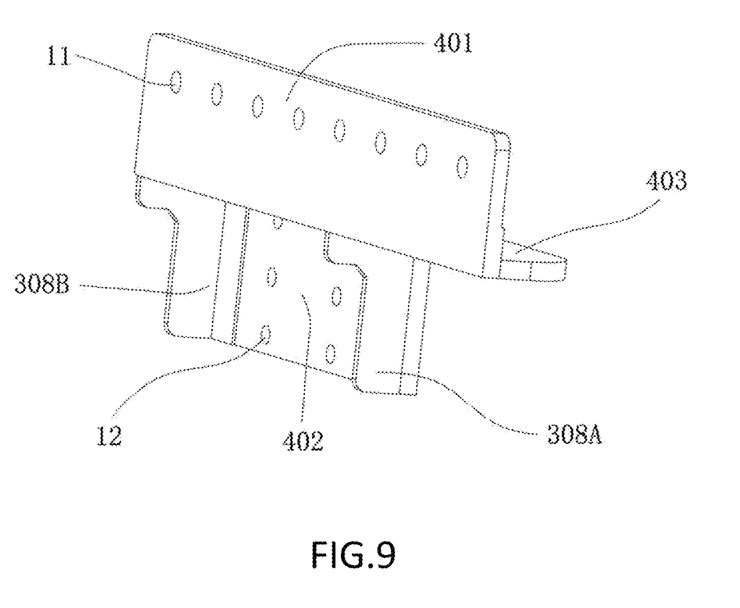
FIG. 9 is a schematic diagram of the Z-shaped connecting plate structure in a specific embodiment of the present invention.
Figure 10:
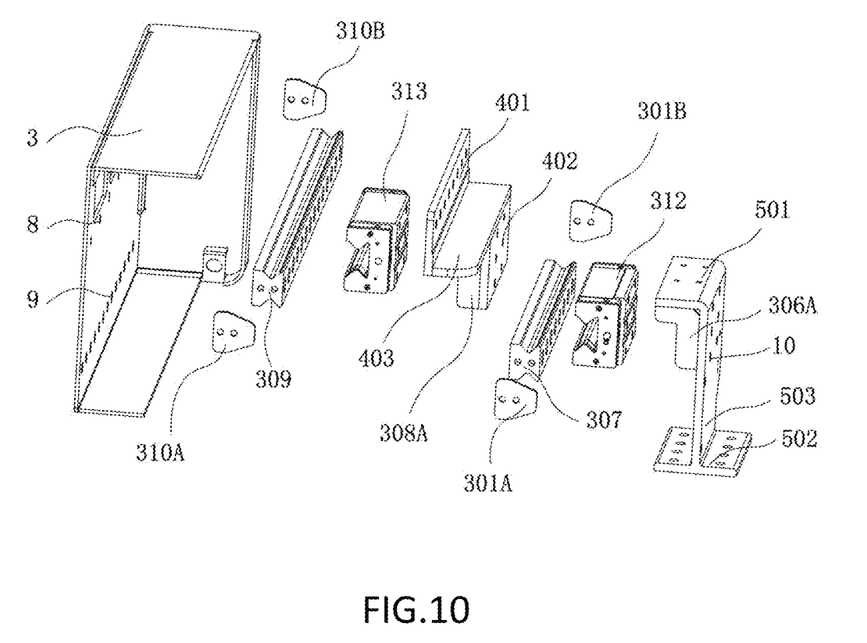
FIG. 10 is a exploded schematic diagram of the cantilever moving component in a specific embodiment of the present invention.
Figure 11:
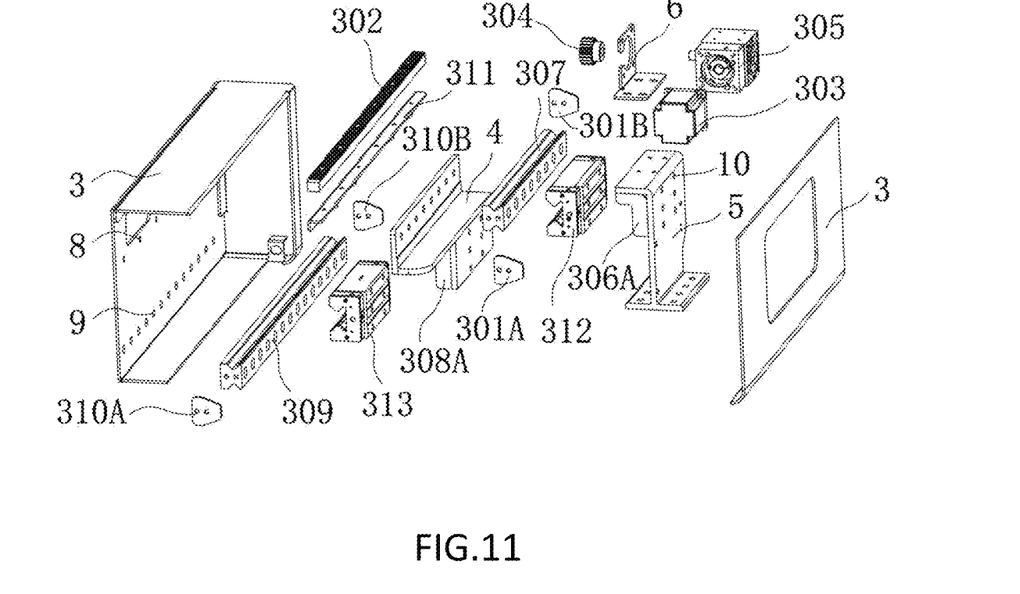
FIG. 11 is a schematic diagram of the internal structure of the bearing box in a specific embodiment of the present invention.

Referring to FIG. 6, the drive device 34 includes a motor base 6, a motor 303, a reducer 305, a gear 304, a rack 302, and a rack frame 311. The motor 303 is mounted on the motor base 6, and the output shaft of the motor 303 is connected to the reducer 305. The output shaft of the reducer 305 is connected to the gear 304. The motor 303 drives the gear 304 to rotate through the reducer 305. The motor base 6, the motor 303, and the reducer 305 are fixed on the support frame 5. The rack 302 is mounted on the rack frame 311, which is fixed on the bearing box 3 through the fixing hole 8. The gear teeth of the gear 304 mesh with the rack teeth of the rack 302, converting the rotary motion of the gear 304 into the linear motion of the rack 302.

Referring to FIGS. 7 to 11, the cantilevered moving component 30 includes the first sliding combination 31, the second sliding combination 32, and the Z-shaped connecting plate 4. The Z-shaped connecting plate 4 includes the upper plate 401, the lower plate 402, and the transverse plate 403. The first sliding combination 31 includes the first guide rail 307 and the first slider 312. One side of the first guide rail 307 is fixed on the upper plate 401 of the Z-shaped connecting plate 4 through the first guide rail fixing hole 11, and the other side is slidingly connected with the first slider 312. The other side of the first slider 312 is fixed on the support frame 5. The second sliding combination 32 includes the second guide rail 309 and the second slider 313. One side of the second guide rail 309 is fixed on the bearing box 3, and the other side is slidingly connected with the second slider 313. The other side of the second slider 313 is fixed on the lower plate 402 of the Z-shaped connecting plate 4 through the second slider fixing hole 12. The transverse plate 403 separates the first guide rail 307 and the second slider 313.

The ends of the first guide rail 307 are equipped with the first limit plate 301A and the second limit plate 301B. The ends of the second guide rail 309 are equipped with the third limit plate 310A and the fourth limit plate 310B. The ends of the lower plate 402 of the Z-shaped connecting plate 4 are equipped with the third baffle 308A and the fourth baffle 308B. The second slider 313 is fixed between the third baffle 308A and the fourth baffle 308B. The third limit plate 310A corresponds to the third baffle 308A, and the fourth limit plate 310B corresponds to the fourth baffle 308B.

Figure 12:
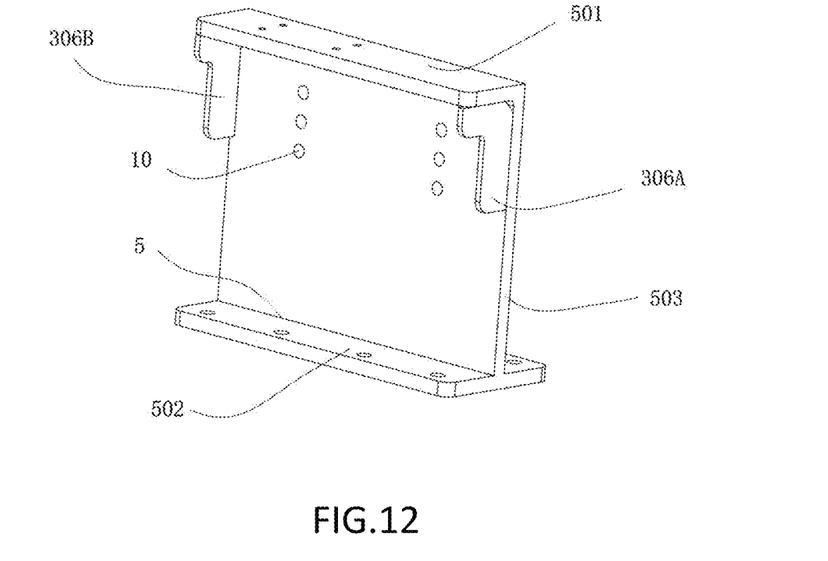
FIG. 12 is a schematic diagram of the support frame structure in a specific embodiment of the present invention.

Referring to FIG. 12, the support frame 5 includes the top plate 501, the vertical plate 503, the bottom plate 502, and the first baffle 306A and the second baffle 306B set on both sides of the support frame 5. The first baffle 306A corresponds to the first limit plate 301A, and the second baffle 306B corresponds to the second limit plate 301B. The second guide rail 309 of the cantilevered moving component 30 is connected to the bearing box 3 through the fixing hole 9. The first slider 312 is fixed on the support frame 5 through the fixing hole 10. The bearing box 3 slides back and forth at the lower end of the support frame 5 through the long strip opening 7.

Figure 13:
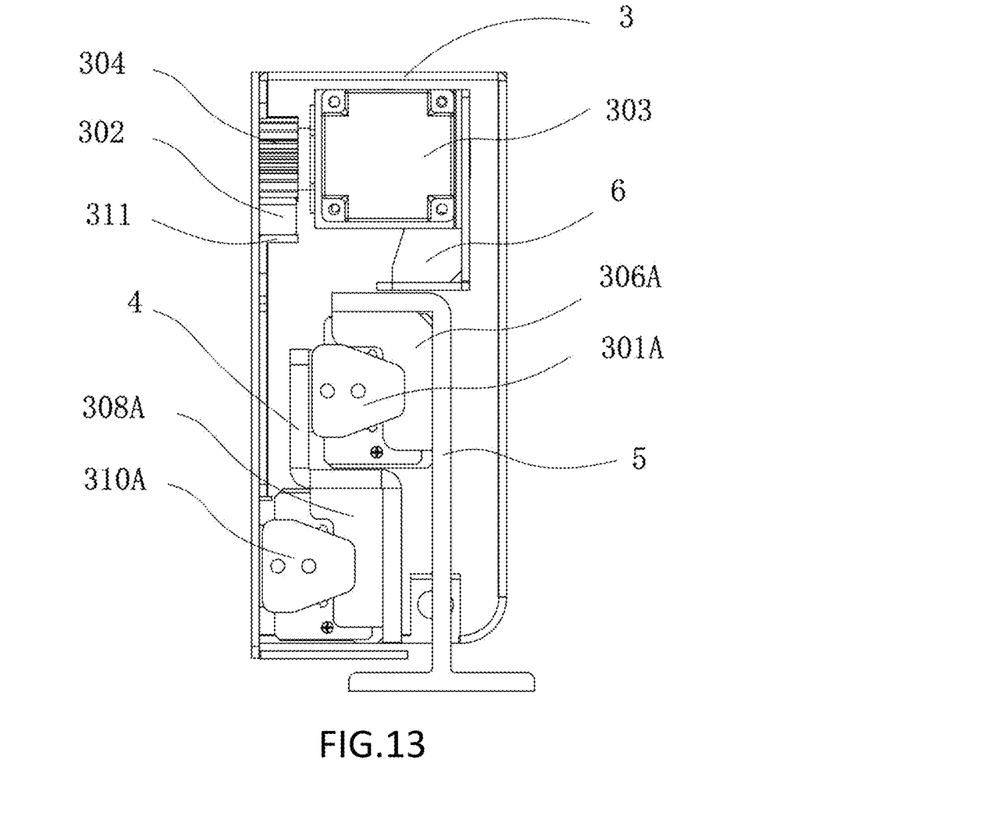
FIG. 13 is a front view of the internal structure of the bearing box in a specific embodiment of the present invention.
Figure 14:
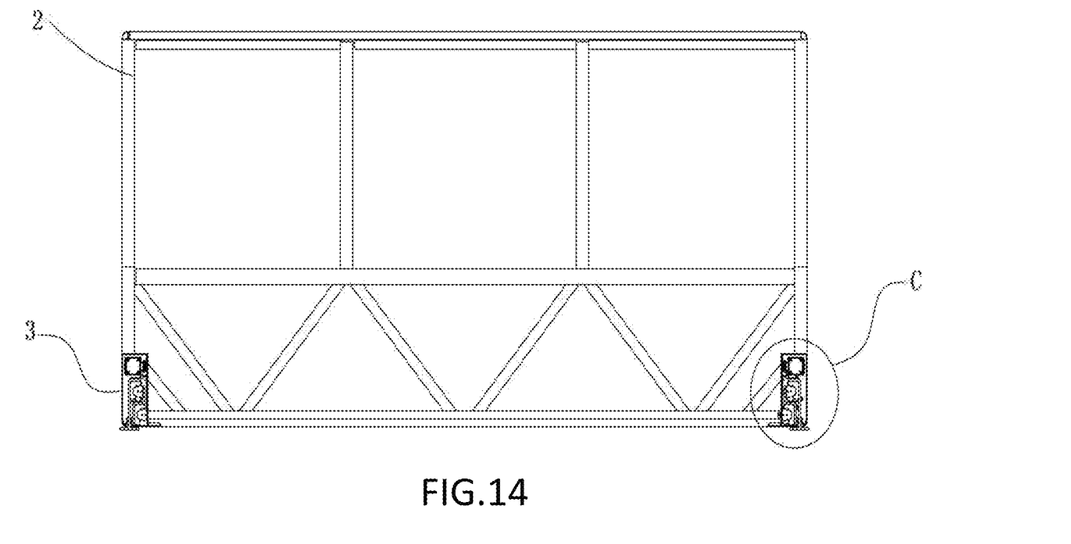
FIG. 14 is the front view of the slide-out box in a specific embodiment of the present invention.

Referring to FIGS. 13 and 14, the cantilevered moving component 30, the drive device 34, the Z-shaped connecting plate 4, and the support frame 5 are integrated into the bearing box 3. The two bearing boxes 3 have identical structures and move synchronously, forming a vehicle slide-out system together. This allows the slide-out box 2 to slide out and retract from the opening of the vehicle body 1 (the position of the bearing box is shown in FIG. 14, arrow C)

Figure 15:
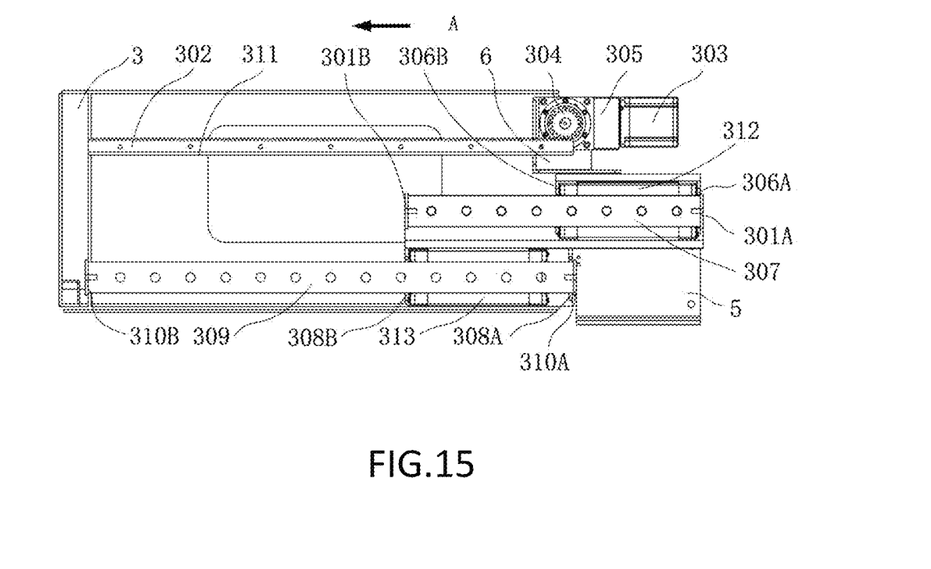
FIG. 15 is the sectional view of the bearing box during sliding out in a specific embodiment of the present invention.

Referring to FIG. 15 is when the cantilevered slide-out system slides out, the first guide rail 307 and the second guide rail 309 of the cantilevered moving component 30 extend to the maximum position through two-stage stretching. The rack 302 of the drive device 34 also moves to the longest distance. The cantilevered moving component bears the weight of the slide-out box as shown by arrow A.

Figure 16:
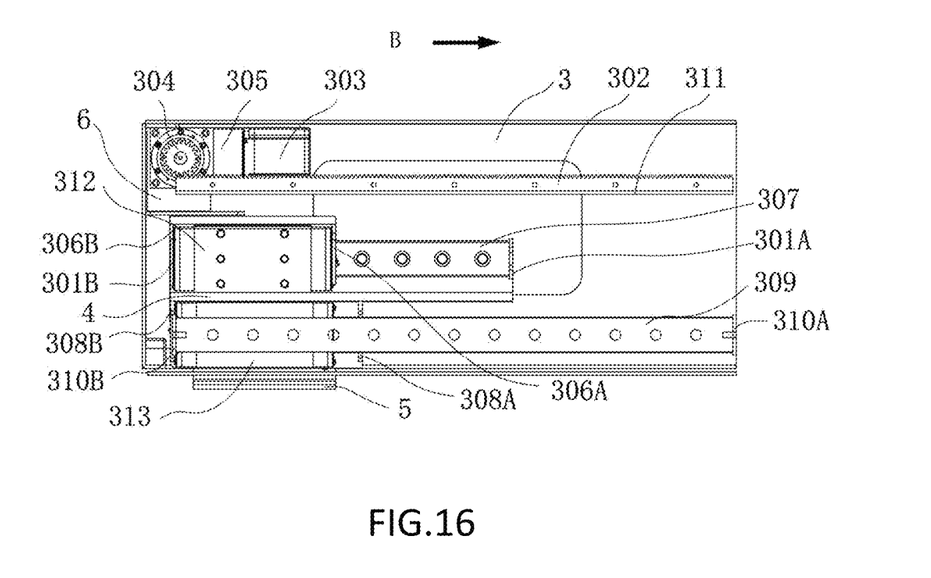
FIG. 16 is a sectional view of the bearing box during retraction in a specific embodiment of the present invention.

Referring to FIG. 16 is when the cantilevered slide-out system retracts, the first guide rail 307 and the second guide rail 309 of the cantilevered moving component 30 retract to the minimum position through two-stage contraction. The rack 302 of the drive device 34 also moves to the shortest distance. The cantilevered moving component still bears the weight of the slide-out box as shown by arrow B.

Figure 17A:
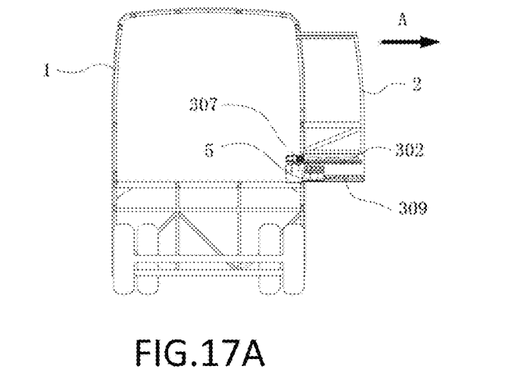
FIG. 17A is a rear sectional view of the slide-out box after sliding out in a specific embodiment of the present invention.
Figure 17B:
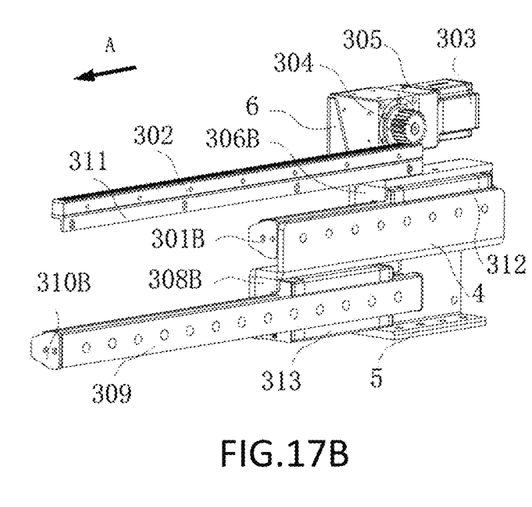
FIG. 17B is a front side view of the slide-out device after sliding out in a specific embodiment of the present invention.
Figure 17C:
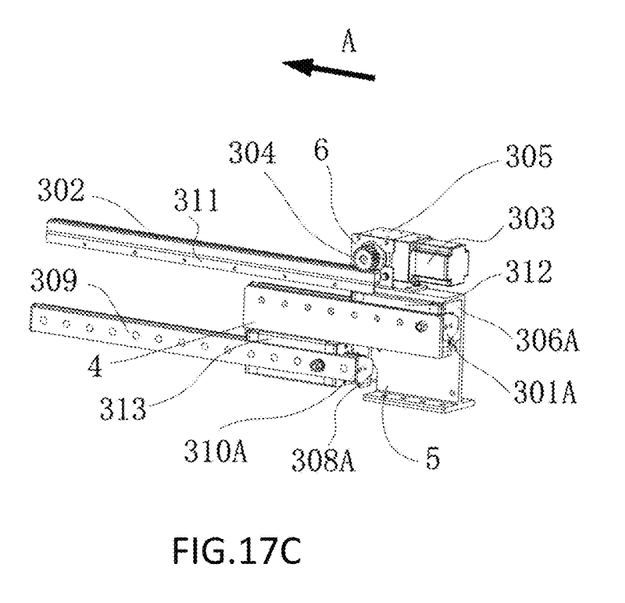
FIG. 17C is a rear side view of the slide-out device after sliding out in a specific embodiment of the present invention.

Referring to FIGS. 17A, 17B, and 17C are when the slide-out box 2 of the vehicle slide-out system slides out, the motor 303 of the drive device 34 drives the gear 304 to rotate through the reducer 305. The teeth of the gear 304 mesh with the teeth of the rack 302, converting the rotary motion of the gear 304 into the linear motion of the rack 302. The rack 302, the rack frame 311, and the bearing box 3 move together. The bearing box 3 drives the second guide rail 309 to slide. During the sliding process, when the third limit plate 310A contacts the third baffle 308A of the Z-shaped connecting plate 4, the Z-shaped connecting plate 4 drives the first slider 312 to move. When the first limit plate 301A of the first guide rail 307 contacts the first baffle 306A of the support frame 5, the sliding process ends, and the movement stops. The slide-out box 2 is fully extended. At this time, the weight of the slide-out box 2 is transmitted to the cantilevered moving component 30 through the bearing box 3. The cantilevered moving component 30 and the Z-shaped connecting plate 4 transfer the weight to the support frame 5, which then transfers it to the vehicle body 1. The support frame 5 supports the entire slide-out box 2, making installation convenient and simple as shown by arrow A.

Figure 18A:
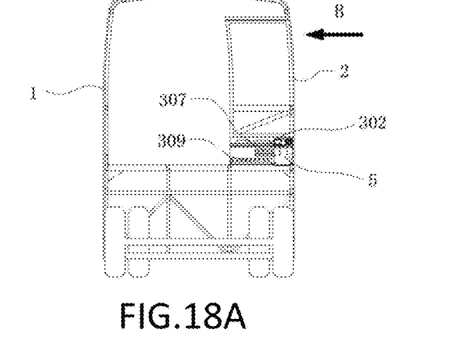
FIG. 18A is a rear sectional view of the slide-out box after retraction in a specific embodiment of the present invention.
Figure 18B:
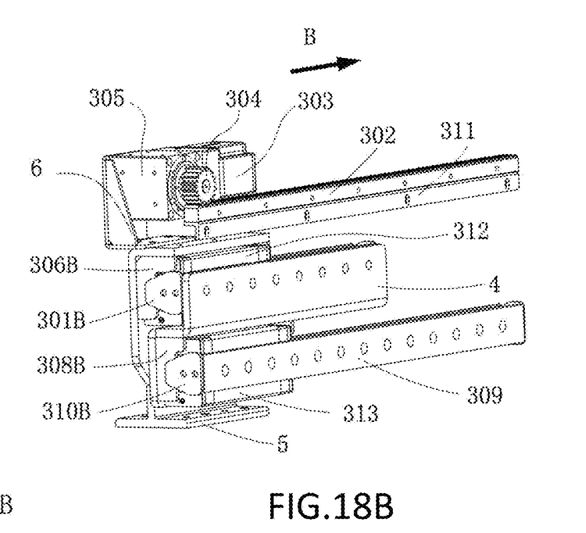
FIG. 18B is a front side view of the slide-out device after retraction in a specific embodiment of the present invention.
Figure 18C:
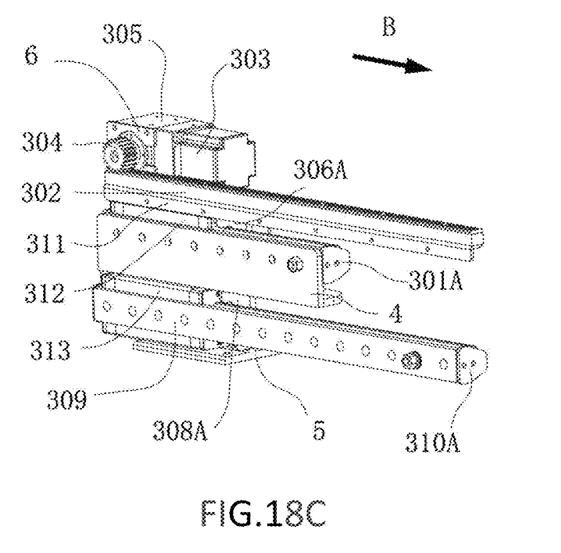
FIG. 18C is a rear side view of the slide-out device after retraction in a specific embodiment of the present invention.

Referring to FIGS. 18A, 18B, and 18C are when the slide-out box retracts, the motor 303 drives the gear 304 to reverse through the reducer 305. The gear 304 drives the rack 302 to move in the opposite direction. The rack 302 drives the bearing box 3 to move inside the opening of the vehicle body 1 through the rack frame 311. The bearing box 3 then drives the second guide rail 309 to slide inward. During the sliding process, when the fourth limit plate 310B contacts the fourth baffle 308B of the Z-shaped connecting plate 4, the Z-shaped connecting plate 4 drives the first slider 312 to move. When the second limit plate 301B of the first guide rail 307 contacts the second baffle 306B of the support frame 5, the retraction process ends, and the movement stops. The box is fully retracted as shown by arrow B.

The above description of the disclosed embodiments enables those skilled in the art to implement or use the present invention. Various modifications to these embodiments will be apparent to those skilled in the art, and the general principles defined herein can be applied to other embodiments without departing from the spirit or scope of the invention. Therefore, the present invention is not limited to the embodiments shown herein but is to be accorded the widest scope consistent with the principles and novel features disclosed herein.

The invention claimed is:

1. A cantilevered vehicle box slide-out system, comprising a slide-out box, a cantilevered moving component, a drive device, a support frame, and bearing boxes, wherein the slide-out box is provided at an opening of a vehicle body, the bearing boxes are fixedly provided at a lower part of the slide-out box, one side of the cantilevered moving component is fixed to the bearing box and the other side is fixed to the support frame, an upper part of the drive device is fixed to the bearing box and the lower part is fixed to the support frame, the support frame is fixed to the vehicle body, and a bottom of the bearing box is provided with a long opening, enabling the bearing box to slide back and forth at a lower end of the support frame through the long opening.

2. The cantilevered vehicle box slide-out system according to claim 1, characterized in that the cantilevered moving component comprises a first sliding combination, a second sliding combination, and a Z-shaped connecting plate, the first sliding combination comprises a first guide rail and a first slider, one side of the first guide rail is fixed to the Z-shaped connecting plate and the other side is slidably connected to the first slider, the first slider is fixed to the support frame, the second sliding combination comprises a second guide rail and a second slider, one side of the second guide rail is fixed to the bearing box and the other side is slidably connected to the second slider, and the second slider is fixed to the connecting plate.

3. The cantilevered vehicle box slide-out system according to claim 2, characterized in that the cantilevered moving component comprises the first sliding combination and the second sliding combination which are parallelly installed inside the bearing box.

4. The cantilevered vehicle box slide-out system according to claim 3, characterized in that the cantilevered moving component slides the slide-out box out and retracts it through the two-stage extension of the first guide rail and the second guide rail.

5. The cantilevered vehicle box slide-out system according to claim 4, characterized in that both ends of the first guide rail are provided with a first limit plate and a second limit plate, and both ends of the second guide rail are provided with a third limit plate and a fourth limit plate.

6. The cantilevered vehicle box slide-out system according to claim 5, characterized in that the Z-shaped connecting plate comprises an upper plate, a lower plate, and a transverse plate, the transverse plate separates the first guide rail and the second slider, both ends of the lower plate are provided with a third baffle and a fourth baffle, the second slider is fixed between the third baffle and the fourth baffle, the third limit plate corresponds to the third baffle, and the fourth limit plate corresponds to the fourth baffle.

7. The cantilevered vehicle box slide-out system according to claim 1, characterized in that the drive device comprises a motor base, a motor, a speed reducer, a gear, a rack, and a rack frame, the motor is mounted on the motor base, an output shaft of the motor is connected to the speed reducer, an output shaft of the speed reducer is connected to the gear, the motor drives the gear to rotate through the speed reducer, the motor base, the motor, and the speed reducer are fixed to the support frame, the rack is mounted on the rack frame, the rack frame is fixed to the bearing box, and teeth of the gear mesh with teeth of the rack to convert rotational movement of the gear into linear movement of the rack.

8. The cantilevered vehicle box slide-out system according to claim 5, characterized in that the support frame comprises a top plate, a vertical plate, a bottom plate, a first baffle, and a second baffle, the first baffle corresponds to the first limit plate, and the second baffle corresponds to the second limit plate.

9. The cantilevered vehicle box slide-out system according to claim 7, characterized in that the rack frame is fixed to an inner side wall of the bearing box, and the second guide rail is fixed to the inner side wall of the bearing box.

10. The cantilevered vehicle box slide-out system according to claim 1, characterized in that the slide-out box is parallelly provided at the opening of the vehicle body.

11. The vehicle cantilevered box slide-out system according to claim 1, characterized in that the cantilevered slide-out box moves parallelly between a slide-out position and the retracted position, and when in a retracted position, the slide-out box is flush with an exterior of the vehicle body, so that the cantilevered moving component and the bearing box are not visible from the exterior of the vehicle body.

\* \* \* \* \*